United States Patent
Leith

(10) Patent No.: US 6,912,929 B2
(45) Date of Patent: Jul. 5, 2005

(54) MULTI-PIECE CRANKSHAFT CONSTRUCTION

(75) Inventor: Donald G. Leith, West Bloomfield, MI (US)

(73) Assignee: Panther Machine, Inc., Wixom, MI (US)

( * ) Notice: Subject to any disclaimer, the term of this patent is extended or adjusted under 35 U.S.C. 154(b) by 251 days.

(21) Appl. No.: 10/261,018

(22) Filed: Sep. 30, 2002

(65) Prior Publication Data

US 2003/0024347 A1 Feb. 6, 2003

Related U.S. Application Data

(60) Continuation-in-part of application No. 09/859,984, filed on May 17, 2001, now Pat. No. 6,820,518, which is a continuation-in-part of application No. 09/533,917, filed on Mar. 23, 2000, now Pat. No. 6,318,443, which is a division of application No. 09/065,155, filed on Apr. 23, 1998, now Pat. No. 6,173,628.

(51) Int. Cl.[7] ............................. F16C 3/04; B23P 17/00
(52) U.S. Cl. ............................. 74/603; 74/595; 74/597; 74/598; 29/888.08; 403/242
(58) Field of Search .................... 74/603, 595, 597, 74/598, 44, 604; 29/888.08; 403/242; 56/17.5

(56) References Cited

U.S. PATENT DOCUMENTS

| | | | |
|---|---|---|---|
| 2,364,109 A | 12/1944 | Taylor | |
| 4,191,238 A | 3/1980 | Pichl | 164/100 |
| 4,262,548 A * | 4/1981 | Haft et al. | 74/44 |
| 4,265,388 A | 5/1981 | Takahashi et al. | 228/135 |
| 4,319,498 A | 3/1982 | McWhorter | 74/595 |
| 4,382,390 A | 5/1983 | Jordan | 74/567 |
| 4,406,590 A | 9/1983 | Kessler | 417/360 |
| 4,493,226 A | 1/1985 | Andrione et al. | 74/598 |
| 4,494,286 A | 1/1985 | Kaufman | 29/156.5 |
| 4,509,378 A | 4/1985 | Brown | 74/44 |
| 4,597,365 A | 7/1986 | Madaffer | 123/90.6 |
| 4,641,546 A | 2/1987 | Mettler | 74/598 |
| 4,730,512 A | 3/1988 | Ito et al. | 74/595 |
| 4,829,642 A | 5/1989 | Thomas et al. | 29/6 |
| 4,829,954 A | 5/1989 | Morgado | 123/193 |
| 4,835,832 A | 6/1989 | Arnold et al. | 29/523 |
| 4,836,297 A * | 6/1989 | Dorner et al. | 173/162.1 |

(Continued)

FOREIGN PATENT DOCUMENTS

| | | | |
|---|---|---|---|
| DE | 364371 | 11/1922 | |
| DE | 422828 | 12/1925 | |
| DE | 542056 | 1/1932 | |
| DE | 663563 | 8/1938 | |
| DE | 822036 | 11/1951 | |
| DE | 891641 | 10/1953 | |
| DE | 1270893 | 6/1968 | |
| EP | 0 530 890 A1 | 3/1993 | ............ F16C/3/10 |
| FR | 763668 | 5/1934 | ........................ 5/3 |
| GB | 2 168 458 A | 6/1986 | ............ F16C/3/10 |
| GB | 2 346 670 A * | 8/2000 | ................. 74/603 |
| JP | 2-180308 | 7/1990 | |
| JP | 10-169638 | 6/1998 | |

Primary Examiner—Vinh T. Luong
(74) Attorney, Agent, or Firm—Gifford, Krass, Groh, Sprinkle, Anderson & Citkowski, P.C.

(57) ABSTRACT

A multi-piece crankshaft having a shaft with two ends and in which the shaft is adapted to rotate about its shaft axis and a crankpin with at least one indentation. The shaft and crankpin are placed within a mold having a first mold cavity corresponding in shape to the desired counterweight and the other end of the shaft is positioned within a second mold cavity corresponding in shape to a flywheel taper support for the crankshaft. The counterweight and flywheel taper support are then both formed by simultaneously casting a liquid material, such as zinc, into both the first and second mold cavities.

9 Claims, 2 Drawing Sheets

U.S. PATENT DOCUMENTS

| | | | |
|---|---|---|---|
| 4,838,116 A | 6/1989 | Saito et al. | 74/595 |
| 4,881,427 A | 11/1989 | Yasutake | 74/603 |
| 4,922,993 A | 5/1990 | Matsuo et al. | 164/104 |
| 4,993,865 A * | 2/1991 | Nagashima | 403/358 |
| 5,038,847 A | 8/1991 | Donahue et al. | 164/112 |
| 5,088,345 A | 2/1992 | Kemmler et al. | 74/598 |
| 5,199,318 A | 4/1993 | Hudson | 74/595 |
| 5,203,230 A | 4/1993 | Distelrath | 74/595 |
| 5,207,120 A | 5/1993 | Arnold et al. | 74/595 |
| 5,293,684 A | 3/1994 | Fry | 29/888.08 |
| 5,495,885 A | 3/1996 | Fowlkes et al. | 164/98 |
| 5,737,976 A | 4/1998 | Haman | 74/579 |
| 5,857,915 A | 1/1999 | Leith | 464/179 |
| 5,983,752 A | 11/1999 | Wahlstrom | 74/603 |
| 6,173,628 B1 | 1/2001 | Leith | 74/598 |
| 6,314,643 B1 | 11/2001 | Leith | 29/888.08 |
| 6,318,443 B1 | 11/2001 | Leith | 164/98 |
| 6,382,298 B2 | 5/2002 | Leith et al. | 164/98 |
| 6,408,716 B1 * | 6/2002 | Phelon | 74/572 |
| 6,684,736 B2 * | 2/2004 | Leith | 74/603 |
| 6,763,586 B2 * | 7/2004 | Schliemann et al. | 29/888.08 |

* cited by examiner

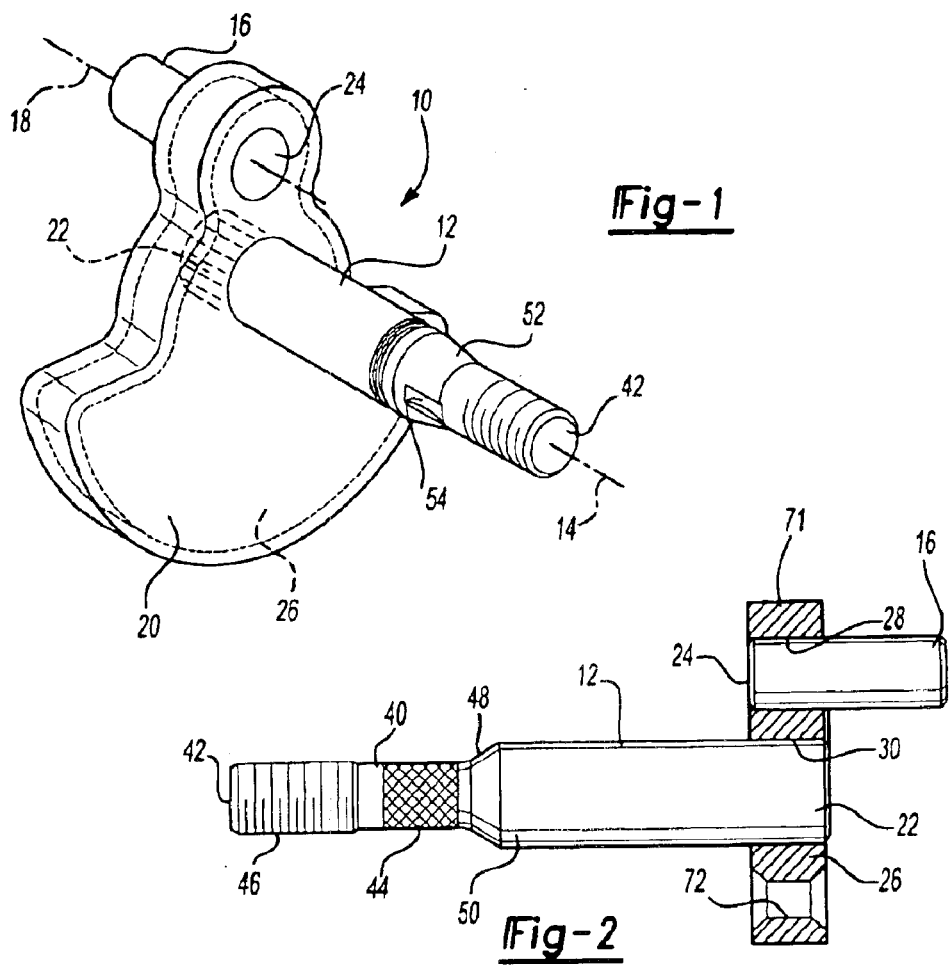
Fig-1
Fig-2
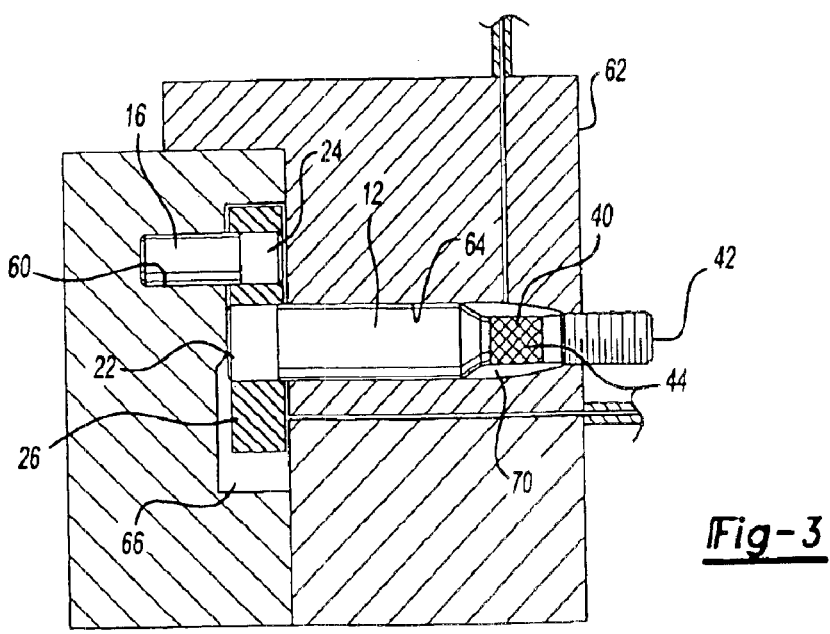
Fig-3

MULTI-PIECE CRANKSHAFT CONSTRUCTION

CROSS-REFERENCE TO RELATED APPLICATIONS

This is a continuation-in-part of U.S. patent application Ser. No. 09/859,984 filed May 17, 2001 now U.S. Pat. No. 6,820,518, which is a continuation-in-part of U.S. patent application Ser. No. 09/533,917, filed Mar. 23, 2000 now U.S. Pat. No. 6,318,443, issued on Nov. 20, 2001, which is a divisional of U.S. patent application Ser. No. 09/065,155 filed Apr. 23, 1998 now U.S. Pat. No. 6,173,628, issued on Jan. 16, 2001.

BACKGROUND OF THE INVENTION

I. Field of the Invention

The present invention relates generally to crankshafts and, more particularly, to a multi-piece crankshaft and method for constructing the same.

II. Description of Related Art

Many previously known crankshafts are made from a heavy single body of cast metal which is then machined so that the main shaft, crankpins and counterweight are all of a one-piece construction. Machining such crankshafts, however, requires specialized equipment and is relatively expensive in manufacturing cost.

There are, however, previously known crankshafts which are constructed from multiple pieces for low cost construction. Such crankshafts are oftentimes used in small two-cycle engines although they can also be used in other types of engines or compressors.

These crankshafts that are used in small two-cycle engines typically comprise a main shaft having one end connected to the counterweight. One end of the crankpin is then also connected to the counterweight at a position radially spaced from the axis of the main shaft. Additionally, a flywheel support taper is formed adjacent the other end of the main shaft. This flywheel support portion includes a tapered mating surface for mating with the flywheel. Additionally, an axially or longitudinally extending key slot is formed in the flywheel taper support for locking the flywheel and main shaft together by a key.

Typically in these multi-piece crankshafts, the counterweights are constructed from an inexpensive material, such as powdered metal or steel stampings, and the counterweight has holes formed in it corresponding to the position of the crankpin and main shaft. The crankpin and main shaft are then constructed from conventional high strength round stock. One end of the main shaft as well as one end of the crankpin are then knurled, splined or otherwise deformed and pressed into the openings formed in the counterweight to thereby form the crankshaft.

In order to form the flywheel support taper, the main shaft is typically machined using lathes or screw machine equipment to form the taper on the main shaft. A second machining operation is then needed to form the axially extending key slot in the flywheel taper support.

A primary disadvantage of these previously known multi-piece crankshafts is that the main shaft and crankpin must be parallel to each other within very high tolerances. Similarly, the precise position of the flywheel support taper as well as the angular and axial position of the keyway must be maintained within very small tolerances. Similarly, both the width and depth of the keyway must be manufactured within very small tolerances in order to meet modem manufacturing specifications.

However, during the pressing operation of the main shaft and crankpin into the counterweight, the main shaft and crankpins often become skewed relative to each other and the resulting crankpin assembly must be either corrected by bending the crankpin and main shaft relative to each other or, in some cases, discarded as scrap. Furthermore, in many cases the precise position of the flywheel support taper together with its key slot may not meet manufacturing tolerances where, during the pressing operation of the main shaft into the counterweight, axial movement of the counterweight relative to the main shaft occurs from spring back or the like.

SUMMARY OF THE PRESENT INVENTION

The present invention provides a multi-piece crankshaft assembly and method for making the same which overcomes all of the above-mentioned disadvantages of the previously known multi-piece crankshaft constructions.

In brief, the crankshaft assembly of the present invention comprises a crankpin and main shaft, both of which are cylindrical in cross-sectional shape. A reduced diameter portion is also formed adjacent the other end of the main shaft. Such a reduced diameter portion can be easily machined on a lathe or similar machine. Furthermore, an indentation, such as a knurl or spline, is formed on the reduced diameter portion of the main shaft.

The crankshaft assembly of the present invention further includes a reinforcing plate constructed of a high strength material, such as steel. This plate includes at least a first and second throughbore which are spaced apart from each other on the plate.

One end of the crankpin is press fit into one of the openings on the plate so that the plate lies in a plane generally perpendicular to the axis of the crankpin. Similarly, the end of the main shaft is press fit into the other opening in the plate.

The crankpin and main shaft are then positioned in cylindrical positioning recesses in a mold having two mold cavities. The first mold cavity corresponds in shape to the desired weight of the counterweight and the plate, as well as the first ends of both the crankpin and main shaft, are positioned within this first mold cavity.

The second mold cavity corresponds in shape to the flywheel support taper with its associated key slot. The indentation adjacent the second end of the main shaft is positioned within the second mold cavity.

The position of the mold recesses for both the main shaft as well as the crankpin, together with the shape of the first mold cavity corresponding to the desired counterweight as well as the second mold cavity corresponding to the desired shape of the flywheel support taper, are machined in the mold with high accuracy. As such, when the crankpin and main shaft are positioned within the mold in the above-described fashion, not only can precise parallelism and radial spacing between the crankpin and main shaft be maintained, but also the precise position of the flywheel support taper as well as the precise position of the flywheel support taper key slot is maintained with a high degree of precision.

After both the crankpin, main shaft and plate are positioned in the mold as described above, both mold cavities are filled with a liquid or molten thermosetting material such as zinc. As used in this patent, the term "thermosetting" means a material which becomes molten at high temperatures, but which rigidifies at a temperature corresponding to or above the internal temperature of an operating internal combustion engine.

Once the mold cavities are filled with the molten material, the molten material fills not only the cavity and the indentations in the ends of the crankpin and main shaft within the counterweight mold cavity, but also the indentation adjacent the other end of the main shaft and which is positioned within the second mold cavity. Consequently, upon hardening, the formerly molten material fills the indentations and thus locks not only the counterweight to both the crankpin and main shaft, but also the flywheel support taper to the main shaft.

Since the position of the main shaft and crankpin are maintained by the mold at a precise position relative to each other, following the casting operation, precise parallelism between the crankpin and main shaft is established as well as precise position of the flywheel support taper for the crankshaft assembly. Furthermore, the cast material also encases the plate which increases the overall structural strength of the counterweight from that obtained by the thermosetting material alone.

BRIEF DESCRIPTION OF THE DRAWING

A better understanding of the present invention will be had upon reference to the following detailed description, when read in conjunction with the accompanying drawing, wherein like reference characters refer to like parts throughout the several views, and in which:

FIG. 1 is an elevational view of a preferred embodiment of the invention;

FIG. 2 is a longitudinal partial sectional view thereof prior to a casting operation;

FIG. 3 is a view similar to FIG. 2, but illustrating the components positioned in a mold;

DETAILED DESCRIPTION OF A PREFERRED EMBODIMENT OF THE PRESENT INVENTION

Figure 4:
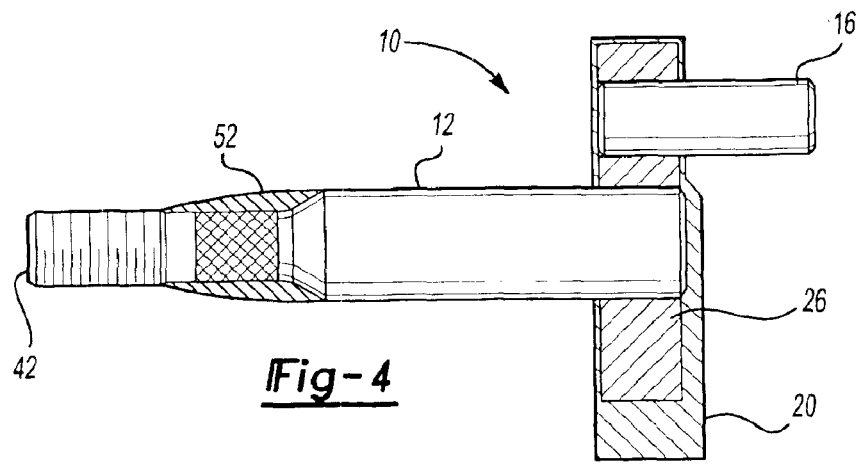
FIG. 4 is a view similar to FIG. 2, but illustrating the preferred embodiment of the invention following the casting operation.

With reference first to FIG. 1, a preferred embodiment of a crankshaft 10 of the present invention is there shown and comprises an elongated main shaft 12 adapted to rotate about its longitudinal axis 14. The crankshaft 10 also includes a crankpin 16 having a longitudinal axis 18 parallel to but radially spaced from the axis 14 of the main shaft 12.

A counterweight 20 extends between a first end 22 of the main shaft and a first end 24 of the crankpin 16. The counterweight 20 effectively secures the crankpin 16 and main shaft 12 together.

In order to strengthen the counterweight 20, a reinforcing plate 26 is contained within the interior of the counterweight 20. The reinforcing plate 26 is constructed of a high strength material, such as steel.

With reference now to FIG. 2, the reinforcing plate 26 includes a first throughbore 28 and a second throughbore 30. The first throughbore 28 is aligned with the crankpin 16 and adapted to receive the end 24 of the crankpin 16 therein. Similarly, the throughbore 30 in the reinforcing plate 26 is aligned with the main shaft 12 and adapted to receive the end 22 of the main shaft 12 therein.

The end 24 of the crankpin 16 is preferably press fit into its receiving hole 28 in the reinforcing plate 26. Similarly, the end 22 of the main shaft 12 is also press fit into its receiving hole 30 in the reinforcing plate 26.

Still referring to FIG. 2, the main shaft 12 includes a reduced diameter portion 40 adjacent its other end 42. This reduced diameter portion 40 includes an indentation 44, such as a spline or a knurl. The free end 42 of the main shaft 12 is then externally threaded as shown at 46.

A small taper 48 is provided between the reduced diameter portion 44 of the main shaft 12 and a main body 50 of the main shaft 12. This small taper 48 minimizes the possibility of fracture at the junction of the reduced diameter portion 40 with the main body 50 of the main shaft 12.

Figure 5:
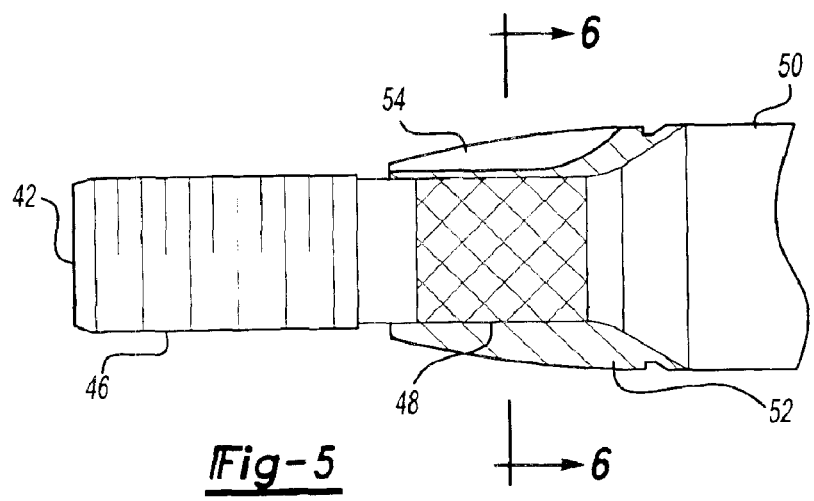
FIG. 5 is an enlarged fragmentary partial sectional view of one end of the main shaft.
Figure 6:
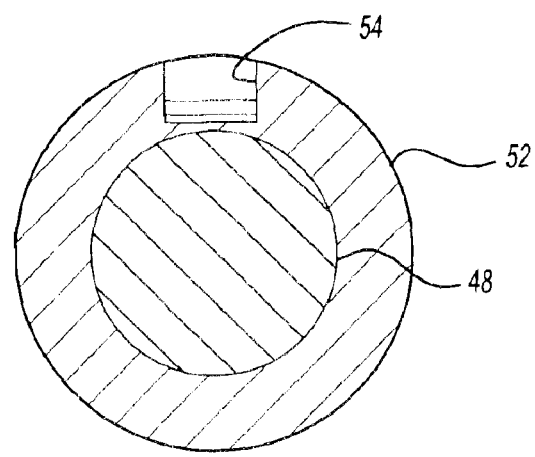
FIG. 6 is a sectional view taken along line 6-6 in FIG. 5 and enlarged for clarity.

With reference now to FIGS. 5 and 6, a flywheel support taper 52 is formed in a fashion to be subsequently described in greater detail around the reduced diameter portion 48 of the main shaft 12. This flywheel support taper 52 forms the mating surface with the engine flywheel (not shown) in the conventional fashion. The flywheel support taper 52 also includes a key slot 54. In operation, with a flywheel positioned over the flywheel support taper, a key (not shown) is positioned within the slot 54 and a facing slot formed in the flywheel (not shown) in order to rotationally lock the flywheel and main shaft 12 together. With the flywheel positioned on the flywheel support taper 52, the flywheel is then secured onto the main shaft by a conventional nut screwed onto the threaded portion 46 of the main shaft 12.

The flywheel support taper 52 is generally conical in shape. Furthermore, its precise position and angle of taper with respect to the main shaft 12 and with respect to the counterweight 20 must be maintained with high precision in order to meet manufacturing requirements. Likewise, the position, depth and width of the key slot 54 on the flywheel support taper 52 must also be formed with a high degree of precision in order to meet manufacturing requirements.

With reference now to FIG. 3, the method for manufacturing the crankshaft assembly 10 of the present invention will now be described in greater detail. After the reinforcing plate 26 has been press fit onto the crankpin 16 and the end 36 of the main shaft 12, the crankpin 16 is positioned within a receiving recess 60 of a mold 62 and, similarly, the main shaft 12 is positioned within a main shaft receiving recess 64 in the mold 62. Since the mold 62 can be machined with a high degree of precision, and thus a high degree of precision maintained between the position of the crankpin receiving recess 60 and main shaft receiving recess 64, the position of the crankpin 16 relative to the main shaft 12 can be precisely and repeatedly maintained. This ensures not only parallelism but also accurate radial spacing between the crankpin 16 and main shaft 12.

The mold 62 also includes a first mold recess 66 corresponding in shape to the shape of the desired counterweight 20. The first end 24 of the crankpin 16, the first end 22 of the main shaft 12, and the reinforcing plate 26 are all positioned within the first mold cavity 66.

The mold 62 further includes a second mold cavity 70 corresponding in shape to the flywheel support taper 52 and its key slot 54. This mold recess 70 is disposed around the reduced diameter portion 40 with its indentation 44 of the main shaft 12. Furthermore, the mold cavity 70 together with its key slot can be machined within the mold 62 with a high degree of precision thus accurately positioning not only the flywheel support taper, but also its key slot in relation to the crankpin 16 and counterweight 20 of the crankshaft 10.

After the crankpin 16, reinforcing plate 26 and main shaft 12 are positioned within the mold 62 in the previously described fashion, the mold cavities 66 and 70 are filled with a molten thermosetting material 71, such as zinc. The molten zinc in the first mold cavity 66 not only fills the mold cavity 66 thus forming the counterweight, but also engulfs the reinforcing plate 26 as well as the first ends 24 and 36 of the crankpin 16 and main shaft 12, respectively. In order to further strengthen the construction of the counterweight 50, the reinforcing plate 26 also preferably includes a further through hole 72 (FIG. 2 ) through which the molten zinc extends thus locking the reinforcing plate 26 to the molten zinc during the casting operation.

Preferably, the first mold cavity 66 and second mold cavity 70 are simultaneously filled with the molten material. Sequential casting of the mold cavities 66 and 70, however, may optionally be performed. In either event, upon solidification of the molten material in the second mold cavity 70, the molten material not only forms the shape of the desired flywheel support taper, but also fills the indentations 44 on the main shaft 12 thus locking the flywheel support taper against rotation and longitudinal movement relative to the main shaft 12.

After the molten material in both of the mold cavities 66 and 70 has cooled and solidified, the crankshaft assembly 10 is removed from the mold 62. The completed crankshaft 10 is illustrated in FIG. 4.

Although preferably the counterweight 20 and flywheel support taper 52 are both formed by the casting operation, alternatively only the flywheel support taper is formed by the casting operation.

A primary advantage of the present invention is that, since the mold 62 with its shaft support recesses 60 and 64 and mold cavities 66 and 70 can be machined with a high degree of precision, the crankshaft assembly of the present invention can be manufactured with a high degree of precision both of the spacing and parallelism of the main shaft 12, crankpin 16 and flywheel support taper 52. Furthermore, virtually an unlimited number of essentially identical crankshaft assemblies can be made using the mold 62.

Any conventional means, such as pouring, injection molding or the like, may be used to introduce the molten or liquid thermosetting material into the mold cavities 66 and 70. Likewise, conventional methods may be used to remove any metal flashing, sprues or the like resulting from the molding or casting operation.

From the foregoing, it can be seen that the present invention provides a simple and yet highly effective crankshaft assembly and method for making the same which achieves not only high precision in the parallelism and spacing between the main shaft and crankpin, but also the shape and position of the flywheel support taper with its key slot. Having described my invention, however, many modifications thereto will become apparent to those skilled in the art to which it pertains without deviation from the spirit of the invention as defined by the scope of the appended claims.

I claim:

1. A crankshaft comprising:

a shaft solid in cross section and having two ends and an axis, said shaft adapted to rotate about said shaft axis, a counterweight secured to one end of said shaft, a portion of said shaft adjacent the other end of said shaft having at least one indentation, a crankpin solid in cross section secured to said counterweight so that an axis of said crankpin is parallel to and radially spaced from said shaft axis, a flywheel support taper coaxially attached to said shaft adjacent the other end of said shaft and around said at least one indentation, said flywheel support taper being formed by casting a liquid thermosetting material around said portion of said shaft, wherein said liquid material fills said at least one indentation and, upon hardening, locks said flywheel support taper to said shaft against both axial and rotational movement.

2. The invention as defined in claim 1 wherein said flywheel support taper includes an axially extending key slot.

3. The invention as defined in claim 1 wherein said liquid material comprises zinc.

4. The invention as defined in claim 1 wherein said at least one indentation comprises a knurled portion on said shaft.

5. The invention as defined in claim 1 and further comprising:

a plate having two spaced openings, said one end of said shaft being positioned in one of said plate openings and one end of said crankpin being positioned in the other plate opening, said counterweight extending between said one end of said shaft and said one end of said crankpin, said counterweight being formed by casting said liquid material around said one end of said shaft and said one end of said crankpin and around said plate.

6. The invention as defined in claim 5 wherein said one end of said crankpin is press fit into said other opening of said plate.

7. The invention as defined in claim 6 wherein said one plate opening is smaller in size than said one end of said shaft.

8. The invention as defined in claim 5 wherein said flywheel support taper and said counterweight are simultaneously formed by casting.

9. The invention as defined in claim 5 wherein said plate includes at least one further through hole.

* * * * *